United States Patent
Suresh et al.

(10) Patent No.: US 11,850,922 B2
(45) Date of Patent: Dec. 26, 2023

(54) DOOR SEAL AND SENSOR ASSEMBLY FOR MOTOR VEHICLE

(71) Applicant: Honda Motor Co., Ltd., Tokyo (JP)

(72) Inventors: Ritesh Suresh, Plain City, OH (US); Hiroshi Shingu, Walled Lake, MI (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/713,671

(22) Filed: Apr. 5, 2022

(65) Prior Publication Data
US 2023/0311627 A1    Oct. 5, 2023

(51) Int. Cl.
*B60J 10/40*    (2016.01)
*B60J 10/21*    (2016.01)
*B60J 5/06*    (2006.01)
*B60J 10/84*    (2016.01)

(52) U.S. Cl.
CPC .................. *B60J 10/40* (2016.02); *B60J 5/06* (2013.01); *B60J 10/21* (2016.02); *B60J 10/84* (2016.02)

(58) Field of Classification Search
CPC ............ E05F 15/46; E05F 15/47; E05F 15/44
See application file for complete search history.

(56) References Cited

U.S. PATENT DOCUMENTS

| | | | |
|---|---|---|---|
| 6,339,305 B1 | 1/2002 | Ishihara et al. | |
| 6,782,759 B2 | 8/2004 | Shank et al. | |
| 7,958,672 B2 | 6/2011 | Ishihara | |
| 8,028,375 B2* | 10/2011 | Nakaura | E06B 7/36 49/28 |
| 8,752,273 B2 | 6/2014 | Miyamoto et al. | |
| 8,752,332 B2* | 6/2014 | Thiele | B60J 5/06 49/27 |
| 9,441,408 B2* | 9/2016 | Matsumoto | H01H 3/142 |
| 9,475,368 B2* | 10/2016 | Choi | B60J 5/0479 |
| 2009/0178343 A1 | 7/2009 | Zimmer et al. | |
| 2011/0047879 A1* | 3/2011 | Shimizu | E05F 15/70 49/358 |
| 2014/0339842 A1* | 11/2014 | Kawaguchi | B60J 10/24 296/1.04 |
| 2016/0305177 A1 | 10/2016 | Koeda et al. | |

(Continued)

FOREIGN PATENT DOCUMENTS

| | | |
|---|---|---|
| JP | 2004332458 A | 11/2004 |
| JP | 4703407 B2 | 6/2011 |

(Continued)

*Primary Examiner* — Daniel P Cahn
*Assistant Examiner* — Patrick B. Ponciano
(74) *Attorney, Agent, or Firm* — Plumsea Law Group, LLC

(57) ABSTRACT

A door seal and sensor assembly for a motor vehicle is disclosed. The assembly includes sealing members that can create seals between vehicle doors and the body of a vehicle. The assembly further includes pressure sensitive components that can detect pinching between vehicle doors and the body of the vehicle. The pressure sensitive components can be retained within retaining portions of lateral sealing members. Relatively rigid connecting members are used to connect the ends of the pressure sensitive components to corresponding wire harnesses. In vehicles that use a dual sliding door assembly, the assembly can be mounted around the entire periphery of an opening in the vehicle body.

20 Claims, 8 Drawing Sheets

(56) References Cited

U.S. PATENT DOCUMENTS

| | | | |
|---|---|---|---|
| 2019/0149151 A1* | 5/2019 | Okada | E05F 15/44 |
| | | | 200/211 |
| 2019/0263238 A1* | 8/2019 | Hiroe | B60R 13/06 |
| 2019/0390501 A1 | 12/2019 | Kawase et al. | |
| 2020/0223295 A1 | 7/2020 | Matsumoto et al. | |
| 2020/0300018 A1 | 9/2020 | Kamitani et al. | |
| 2021/0324670 A1* | 10/2021 | Matsumoto | E05F 15/44 |
| 2022/0325570 A1* | 10/2022 | Matsumoto | B60J 5/0468 |
| 2023/0039719 A1* | 2/2023 | Shingu | B60J 5/0468 |
| 2023/0202277 A1* | 6/2023 | Park | B60J 10/86 |
| | | | 49/498.1 |
| 2023/0203851 A1* | 6/2023 | Park | E05F 15/44 |
| | | | 49/28 |

FOREIGN PATENT DOCUMENTS

| | | |
|---|---|---|
| JP | 2019100152 A | 6/2019 |
| WO | 2018060653 A1 | 4/2018 |

* cited by examiner

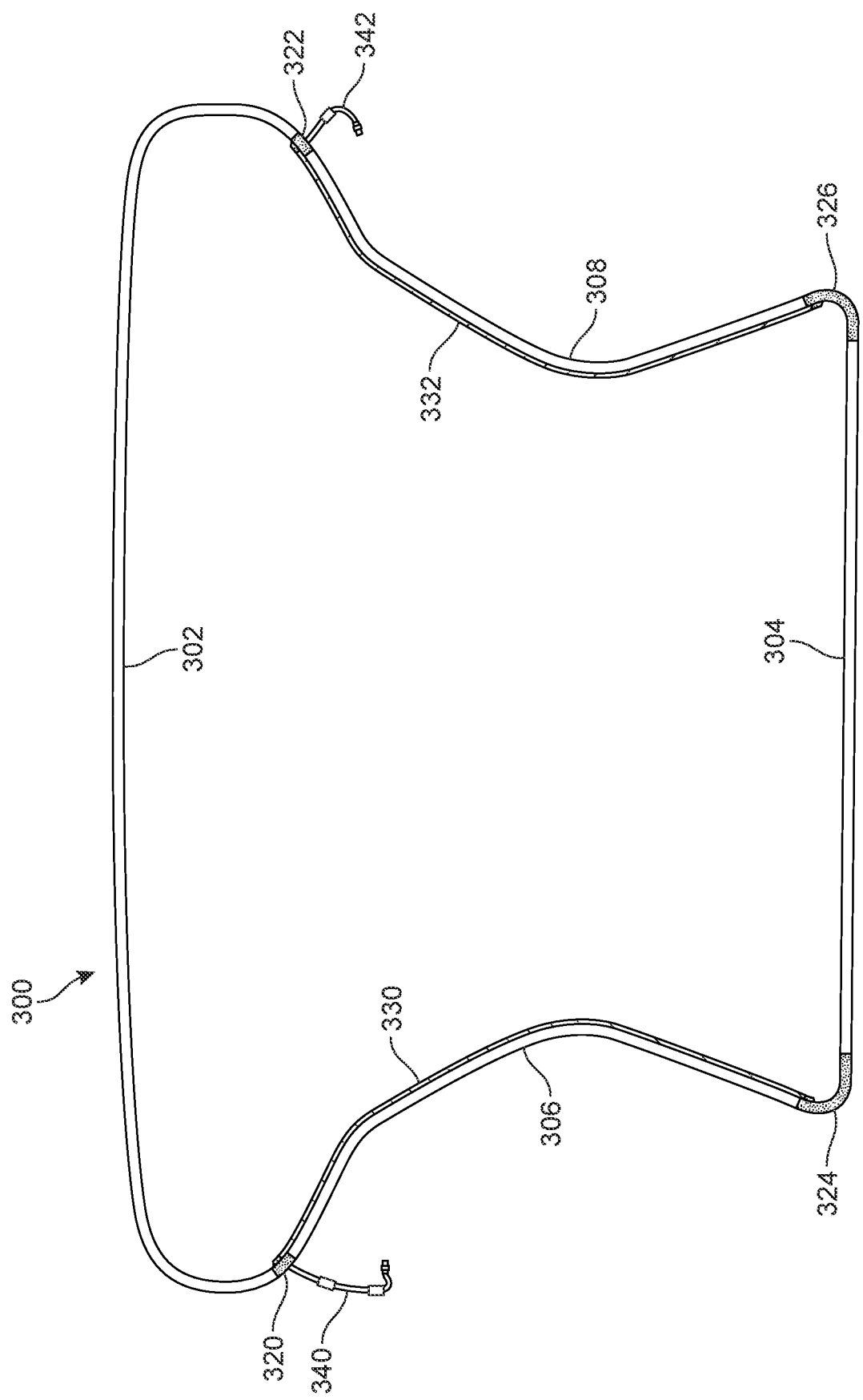

DOOR SEAL AND SENSOR ASSEMBLY FOR MOTOR VEHICLE

BACKGROUND

The embodiments relate generally to systems for mounting sensors to vehicles, and in particular, to systems for mounting pressure sensitive sensors to vehicles.

Sliding doors in vehicles may include so called "pinch" sensors that help to prevent an occupant's hands, feet, etc. from being pinched as the sliding door closes. The pinch sensors may be pressure sensors that are mounted at a location adjacent to where the sliding door contacts (or is disposed immediately adjacent to) the vehicle body as the door is closed. These sensors are generally located in an area where the door must seal with the vehicle body. Because the sensors do not run along the entire periphery of the door opening, it may be difficult to incorporate a sensor and ensure the door is properly sealed. In addition, the sensors may be subjected to various stresses as occupants enter and exit a vehicle, since the sensors may be partially exposed when the sliding door is open. In particular, there may be strain placed on any electrical connections between the sensor and electrical components attached to the vehicle body.

There is a need in the art for a system and method that addresses the shortcomings discussed above.

SUMMARY

Embodiments provide systems for sealing vehicle doors and for retaining pressure sensitive components along the periphery of a door opening in a vehicle body.

In one aspect, a motor vehicle includes a vehicle body comprising a door opening. The door opening is disposed within an opening periphery of the vehicle body. The opening periphery includes an upper body portion, a lower body portion, a and lateral body portion. The motor vehicle further includes a sliding door configured to cover at least a portion of the opening when the sliding door is closed, and a lateral sealing member attached to the lateral body portion and an upper sealing member attached to the upper body portion. The lateral sealing member includes a retaining portion. The motor vehicle also includes a connecting member disposed between the lateral sealing member and the upper sealing member, where the connecting member includes an interior cavity, a first opening providing access to the interior cavity, and a second opening providing access to the interior cavity. The motor vehicle also includes a pressure sensitive component including a first end portion, a second end portion, and an intermediate portion, and a wire harness configured to connect to the first end portion of the pressure sensitive component. The intermediate portion of the pressure sensitive component is retained within the retaining portion of the lateral sealing member. The first end portion of the pressure sensitive component is disposed through the first opening and within the interior cavity of the connecting member. A portion of the wire harness is inserted through the second opening of the connecting member. The first end portion of the pressure sensing component connects to the portion of the wire harness within the interior cavity of the connecting member.

In another aspect, an assembly for installation within a motor vehicle, where the motor vehicle having a lateral body portion and an upper body portion disposed around a door opening of the motor vehicle, includes a lateral sealing member configured to be attached to the lateral body portion of the motor vehicle and an upper sealing member configured to be attached to the upper body portion of the motor vehicle. The lateral sealing member includes a retaining portion. The assembly also includes a connecting member disposed between the lateral sealing member and the upper sealing member, where the connecting member includes an interior cavity, a first opening providing access to the interior cavity and a second opening providing access to the interior cavity. The assembly also includes a pressure sensitive component including a first end portion, a second end portion, and an intermediate portion. The intermediate portion of the pressure sensitive component is retained within the retaining portion of the lateral sealing member. The first end portion of the pressure sensitive component is disposed through the first opening and within the interior cavity of the connecting member. The second opening is configured to receive a portion of a wire harness, so that the pressure sensitive component and the portion of the wire harness can be connected within the interior cavity.

In another aspect, a motor vehicle, includes a vehicle body with a door opening, the door opening being disposed within an opening periphery of the vehicle body. The opening periphery includes an upper body portion, a lower body portion, a first lateral body portion, and a second lateral body portion. The motor vehicle also includes a first sliding door configured to cover a first portion of the door opening when the first sliding door is closed and a second sliding door configured to cover a second portion of the door opening when the second sliding door is closed. The motor vehicle also includes a first lateral sealing member attached to the first lateral body portion, a second lateral sealing member attached to the second lateral body portion, and an upper sealing member attached to the upper body portion. The first lateral sealing member includes a first retaining portion and the second lateral sealing member includes a second retaining portion. The motor vehicle also includes a first connecting member disposed between the first lateral sealing member and the upper sealing member, where the first connecting member includes a first interior cavity, and a second connecting member disposed between the second lateral sealing member and the upper sealing member, where the second connecting member includes a second interior cavity. The motor vehicle also includes a first pressure sensitive component and a second pressure sensitive component, as well as a first wire harness configured to connect to the first pressure sensitive component and a second wire harness configured to connect to the second pressure sensitive component. The first pressure sensitive component is retained within the first retaining portion, and an end portion of the first pressure sensitive component connects to the first wire harness within the first interior cavity of the first connecting member. The second pressure sensitive component is retained within the second retaining portion, and where an end portion of the second pressure sensitive component connects to the second wire harness within the second interior cavity of the second connecting member.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 3 is a schematic view of some components of a vehicle including sealing members and pressure sensitive components, according to an embodiment;

DETAILED DESCRIPTION

Embodiments provide systems for sealing vehicle doors and for retaining pressure sensitive components along the periphery of a door opening in a vehicle body. The pressure sensitive components are retained in a manner that reduces strain on electrical connections between the pressure sensitive components and wiring harnesses.

Figure 1:
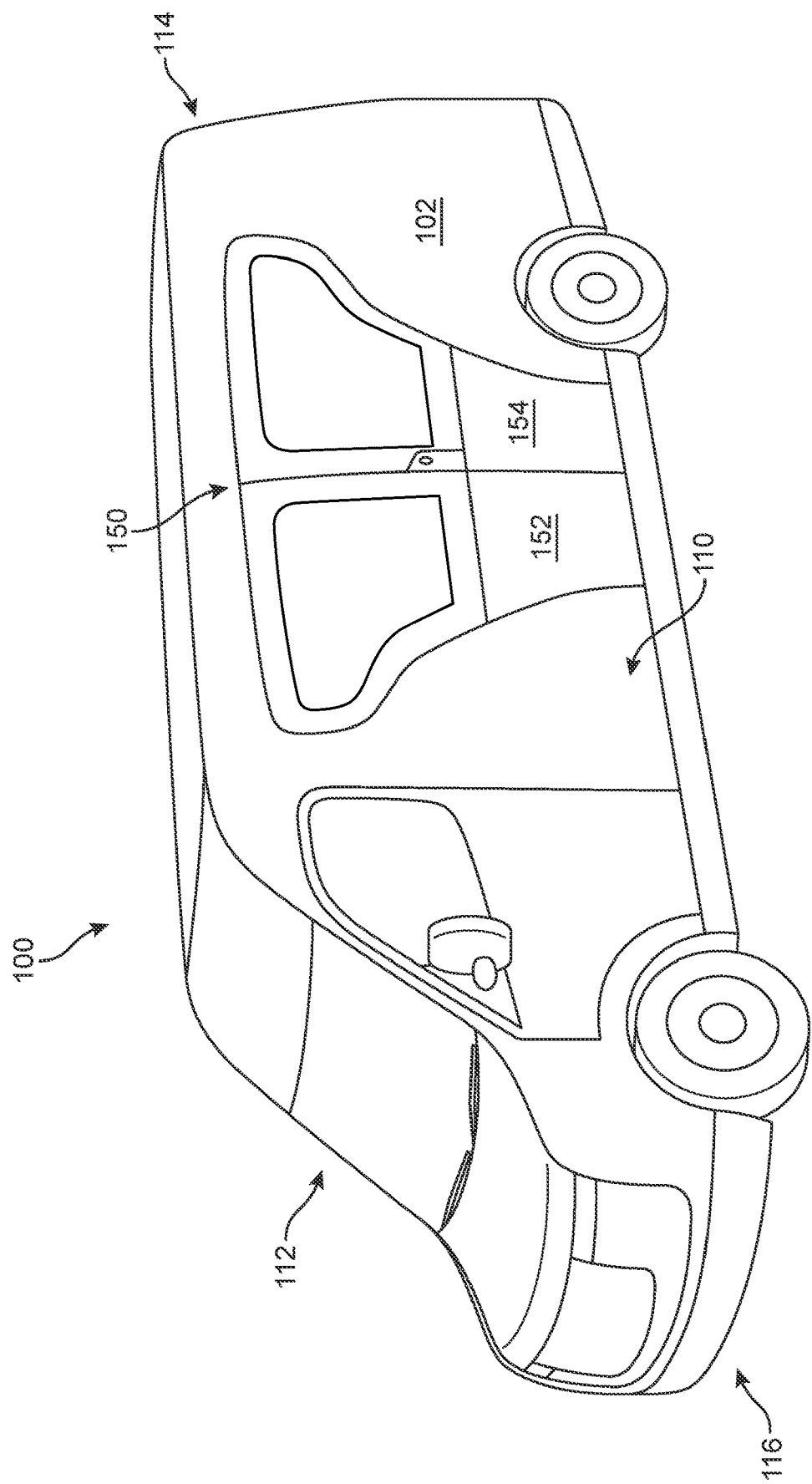
FIG. 1 is a schematic view of a motor vehicle including a dual sliding door assembly, according to an embodiment.

For purposes of introduction, an overview of one embodiment of the proposed systems and methods is illustrated with reference to FIGS. 1 and 2A-2B. Referring first to FIG. 1, a vehicle 100 includes a dual sliding door assembly 150 mounted to a vehicle body 102.

Simply for purposes of reference, vehicle 100 may be understood to generally comprise a forward end portion ("forward end") 116, a rearward end portion ("rearward end") 114, a first side portion ("first side") 110 and a second side portion ("second side") 112.

For purposes of convenience, the description makes reference to a longitudinal direction, which extends along a length of a component, such as the length of the vehicle 100 between the forward end 116 and rearward end 114. Similarly, the description makes reference to a lateral direction, which extends along a width of each component, such as between the first lateral side 110 and second lateral side 112 of vehicle 100. In addition, the description makes reference to a vertical direction, which is a extending along a height of each component. For example, in a vehicle, the vertical direction runs from the roof structure to the floor of the vehicle.

For clarity, vehicle 100 is depicted as a large passenger van. However, in other embodiments, a dual sliding door assembly, with the features described herein, could be incorporated into any suitable type of vehicle, including any car, van, truck, or bus. Furthermore, in some cases, a dual sliding door assembly could be incorporated into an autonomous vehicle ("AV") which could be used, for example, to drive around large numbers of passengers.

Dual sliding door assembly 150 can comprise a first sliding door 152 and a second sliding door 164. First sliding door 152 may also be referred to as a front sliding door, as first sliding door 152 is located closer to forward end 116 of vehicle 100 than is second sliding door 154. Likewise, second sliding door 154 may also be referred to as a rear sliding door, as second sliding door 154 is located close to rearward end 114 to vehicle 100 than is first sliding door 152.

Figure 2A:
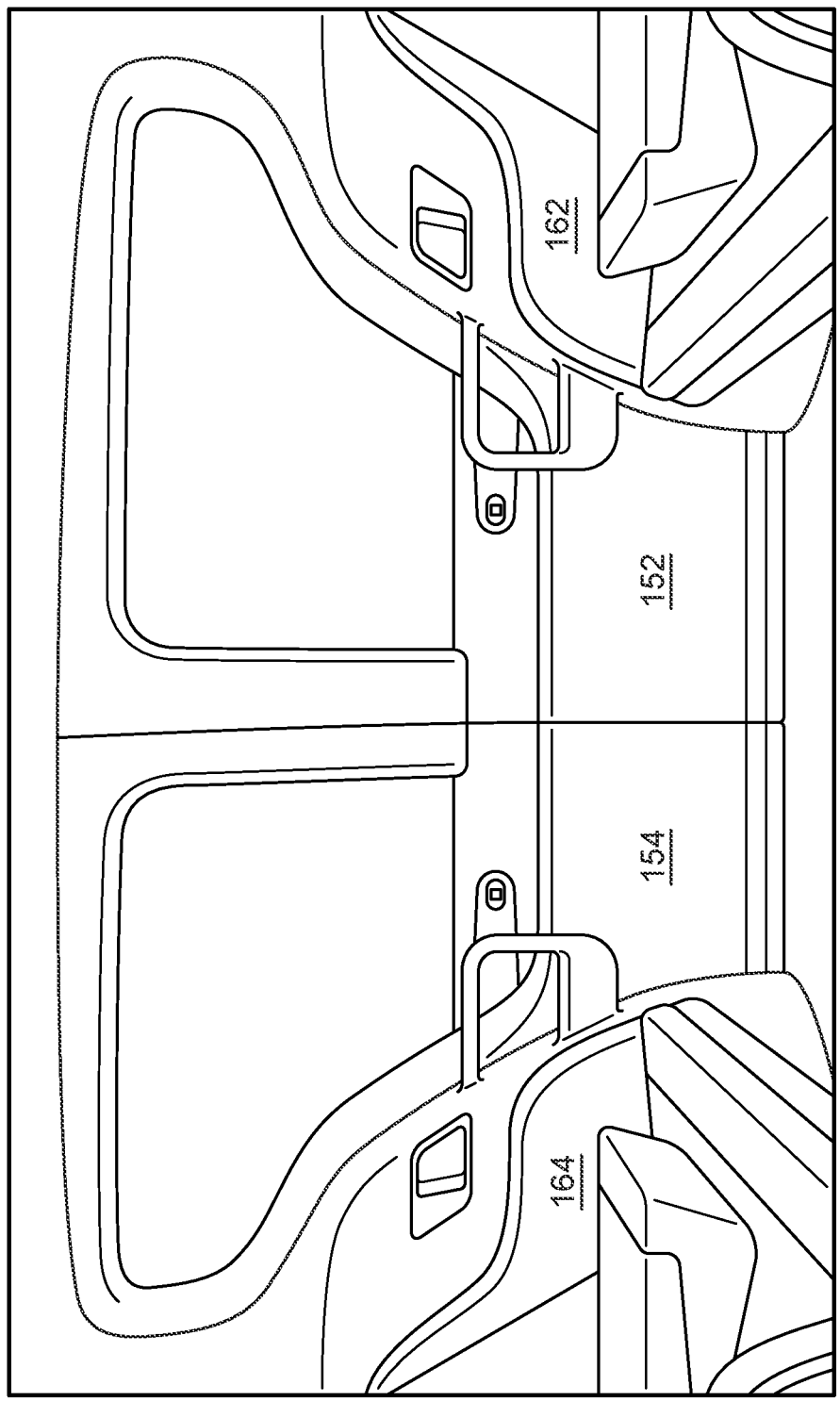
FIG. 2A is a schematic view of an interior portion of a motor vehicle with a dual sliding door assembly, according to an embodiment.
Figure 2B:
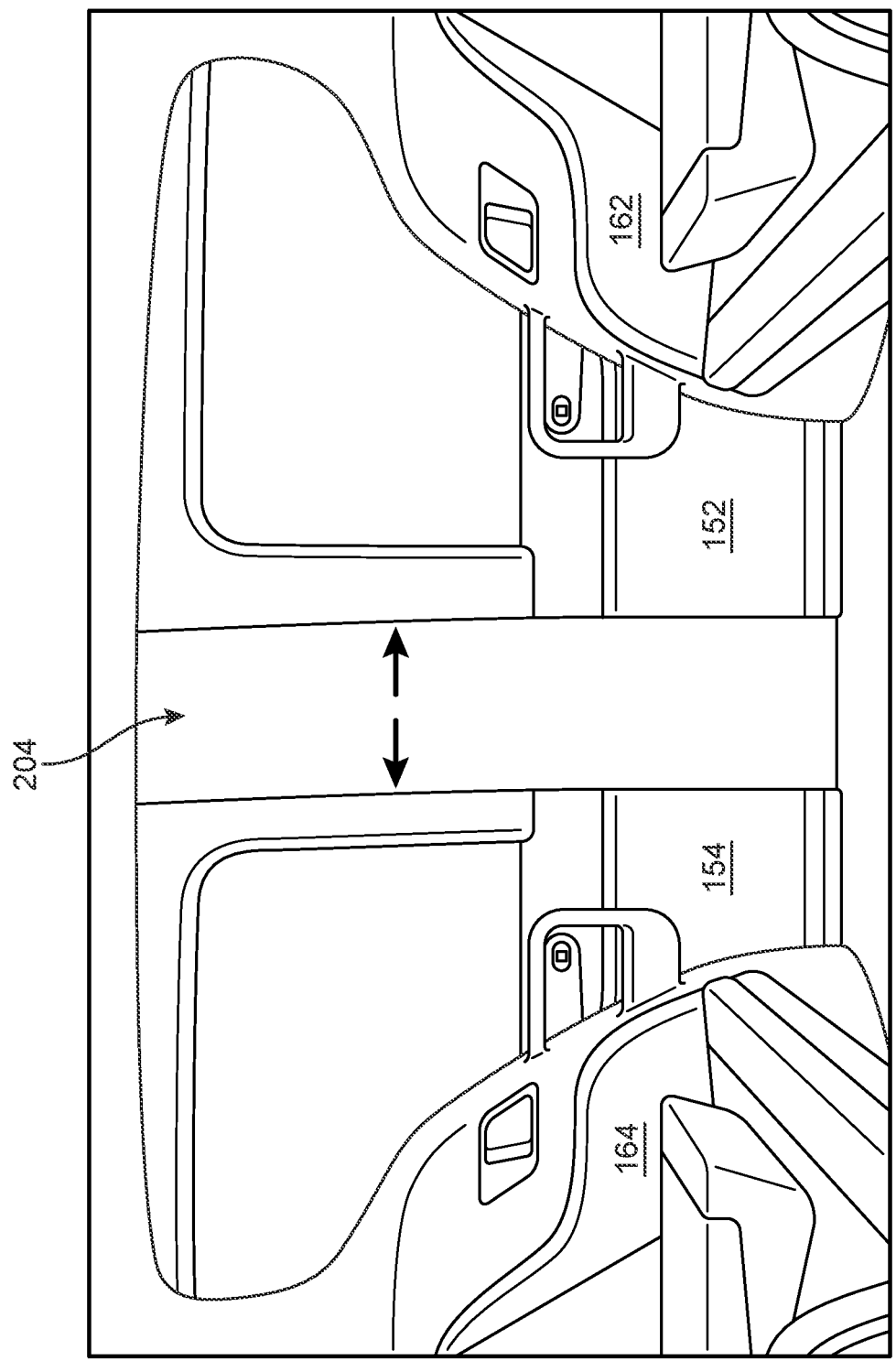
FIG. 2B is a schematic view of an interior portion of a motor vehicle with a dual sliding door assembly in a partially open configuration, according to an embodiment.

FIGS. 2A and 2B depict a view of dual sliding door assembly 150 as seen from within an interior cabin of vehicle 100. For purposes of illustration, partial views of two opposing seats (first seat 160 and second seat 162) are shown. In FIG. 2A, dual sliding door assembly 150 is shown in a "closed" position, in which first sliding door 152 and second sliding door 154 are positioned to cover the entirety of an opening within the body of vehicle 100. FIG. 2B depicts dual sliding door assembly 150 in a "partially open" position, in which first sliding door 152 and second sliding door 154 have moved away from one another and created a partial opening 204 between them. It may be appreciated that in a "fully open" position, which is not shown here, the first and second sliding doors may be positioned along vehicle 100 to create an opening between them that is sufficient for occupants of vehicle 100 to pass through as they enter and exit the vehicle.

Vehicle 100 may include provisions for sealing first sliding door 152 and second sliding door 154 to vehicle body 102 as the doors are closed. Additionally, vehicle 100 may include provisions for sensing pressure along the lateral sides of an opening in the vehicle body, to help prevent the doors from pinching objects as the doors close. In some embodiments, a vehicle may include a door seal and sensor assembly that can be used to mount pressure sensors along the periphery of the door opening, while maintaining a good seal for the doors and also limiting strain on the electrical connections between the pressure sensors and the vehicle body.

FIG. 3 shows a schematic view of a door seal and sensor assembly 300 ("assembly 300"), according to an embodiment. Referring to FIG. 3, sensor assembly 300 includes a plurality of sealing members, which include an upper sealing member 302, a lower sealing member 304, a first lateral sealing member 306 and a second lateral sealing member 308. Assembly 300 may further include a first connecting member 320, which is disposed between first lateral sealing member 306 and upper sealing member 302. Assembly 300 may also include a second connecting member 322, which is disposed between second lateral sealing member 308 and upper sealing member 302. As seen in FIG. 3, in some embodiments, upper sealing member 302 may extend continuously from first connecting member 320 to second connecting member 322, thereby providing a continuous seal between dual sliding doors and an upper body portion of a vehicle body.

In the exemplary embodiment, assembly 300 may also include a third connecting member 324 that is disposed between first lateral sealing member 306 and lower sealing member 304. Also, assembly 300 may include a fourth connecting member 326 that is disposed between second lateral sealing member 308 and lower sealing member 304.

Assembly 300 may also include a first pressure sensitive component 330 and a second pressure sensitive component 332, which are comprised of pressure sensors embedded in an exterior structure. Each pressure sensitive component may comprise an elongated component that is configured to run along the lateral sides of the door opening in the vehicle body. As seen in FIG. 3, first pressure sensitive component 330 may be disposed along first lateral sealing member 306.

In particular, first pressure sensitive component 330 extends from first connecting member 320 to third connecting member 324. Second pressure sensitive component 332 is disposed against second lateral sealing member 308, and extends from second connecting member 322 to fourth connecting member 326.

To receive power and/or transmit information to another system within the motor vehicle, each pressure sensitive component may connected to a wire harness. For example, first pressure sensitive component 330 is connected, at an end, to a first wire harness 340. Likewise, second pressure sensitive component 332 is connected, at an end, to a second wire harness 342.

In different embodiments, the relative material properties of different members of a door seal and sensor assembly could vary. In an exemplary embodiment, sealing members may be relatively more flexible than connecting members. Or, characterized another way, connecting members may be relatively more rigid than sealing members. This allows sealing members the necessary flexibility to provide a good seal between a door and vehicle frame. This also allows the connecting members to provide sufficient strength to hold the ends of pressure sensitive components in place, and reduce strain at the electrical connections between the pressure sensitive components and wire harnesses connected to the vehicle body.

In some embodiments, sealing members may comprise a material including rubber. Additionally, in some embodiments, connecting components may comprise a material including plastic. In some cases, connecting components could comprise a molded plastic.

The embodiments may use any suitable pressure sensitive components, including any suitable pressure sensors. Pressure sensitive components could include electrical components configured to detect changes in pressure, which are further enclosed within an outer layer of durable and flexible material. For example, in some cases, the outer layer could be a layer of rubber.

Figure 4:
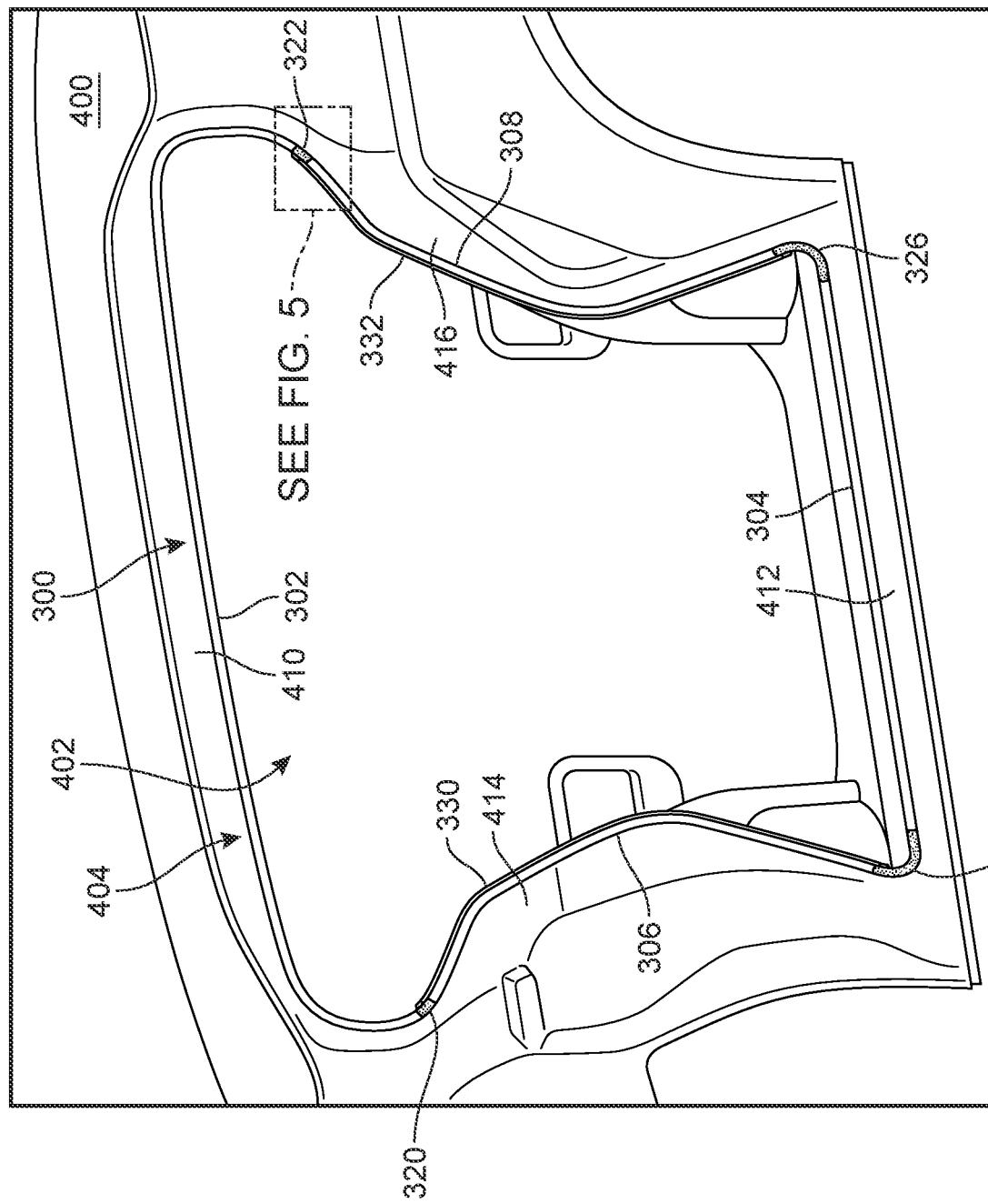
FIG. 4 is a schematic view of the components of FIG. 3 mounted to a vehicle body, according to an embodiment.

FIG. 4 shows a schematic isometric view of assembly 300 installed within the periphery 404 of a door opening 402. Here, periphery 404 may be a part of a vehicle body 400. For purposes of illustration, only some portions of the vehicle exterior and interior are shown.

Referring to FIG. 4, assembly 300 is mounted around periphery 404. In particular, upper sealing member 302 is attached to an upper body portion 410 of vehicle body 400 and lower sealing member 304 is attached to a lower body portion 412 of vehicle body 400. Additionally, first lateral sealing member 306 is attached to first lateral body portion 414 of vehicle body 400. Second lateral sealing member 308 is attached to second lateral body portion 416 of vehicle body 400. With this configuration, assembly 300 provides a way to seal the space between periphery 404 and the vehicle doors (for example, first sliding door 152 and second sliding door 154 of FIG. 1) when the doors are closed.

In addition, first pressure sensitive component 330 is mounted in a position to detect pinching between a first sliding door (for example, first sliding door 152) and first lateral body portion 414. Second pressure sensitive component 332 is mounted in a position to detect pinching between a second sliding door (for example, second sliding door 154) and second lateral body portion 416.

The embodiments use connecting members that are sufficiently rigid to secure the ends of each pressure sensitive component in place along assembly 300. Moreover, using sufficiently rigid connecting members helps to reduce strain in the electrical connections between each pressure sensitive component and a corresponding wire harness.

Figure 5:
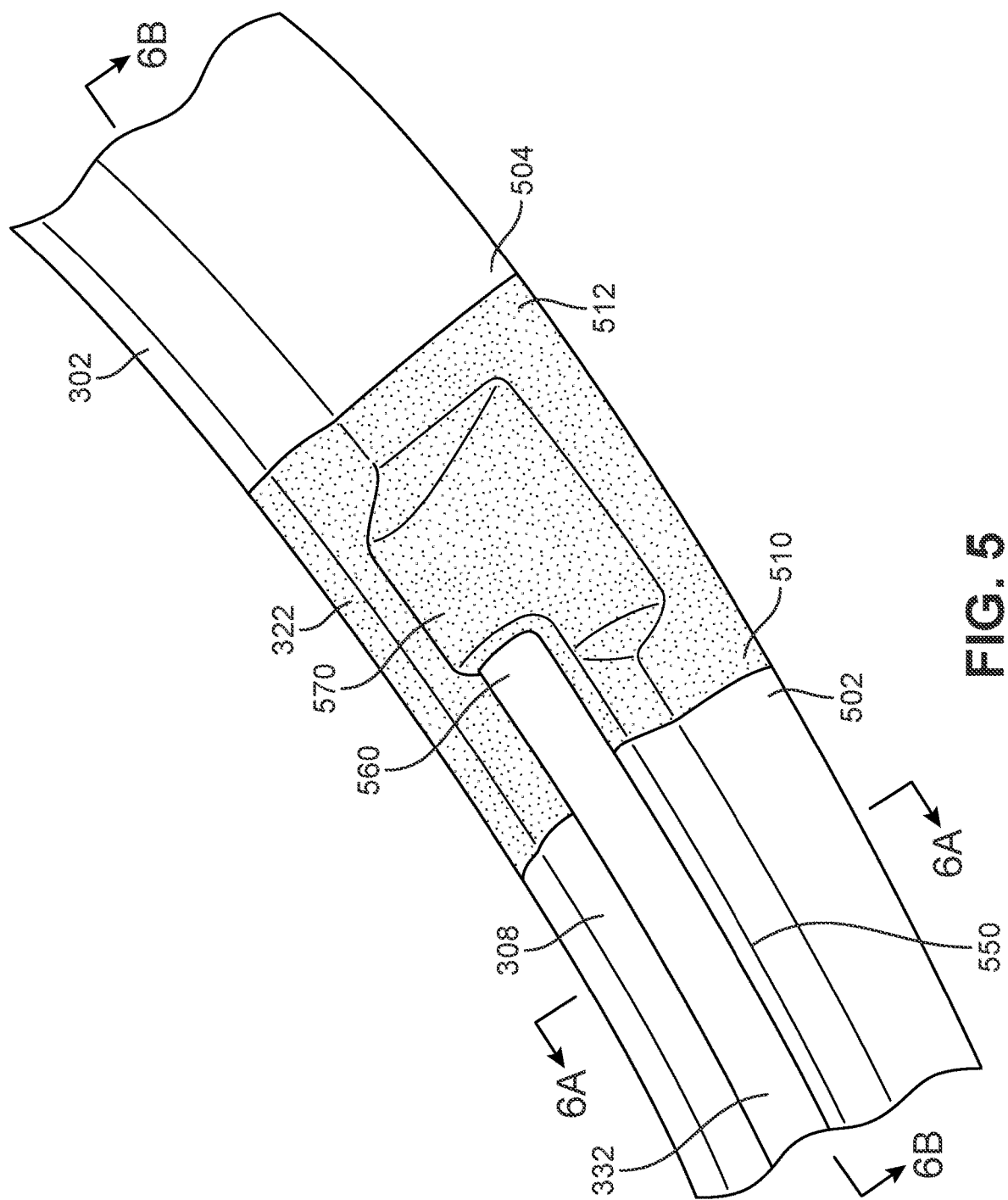
FIG. 5 is a schematic enlarged view of a portion of a door seal and sensor assembly, according to an embodiment.

FIG. 5 is a schematic view of an enlarged region of assembly 300 as indicated in FIG. 4. Referring to FIG. 5, connecting member 322 is disposed between lateral sealing member 308 and upper sealing member 302. More specifically, an end portion 502 of lateral sealing member 308 abuts a first end portion 510 of connecting member 322. Also, an end portion 504 of upper sealing member 302 abuts a second end portion 512 of connecting member 322.

In some embodiments, connecting member 322 may be permanently attached to one or both of lateral sealing member 308 and upper sealing member 302. In some embodiments, connecting member 322 may be bonded to lateral sealing member 308 and upper sealing member 302. In some cases, connecting member 322, upper sealing member 302, and lateral sealing member 308 could be bonded together using an adhesive. In other cases, each of these members could be separately attached directly to a vehicle body, so that the relative positions of these components with respect to one another remain substantially unchanged.

As also seen in this enlarged view, lateral sealing member 308 includes a retaining portion 550 for retaining pressure sensitive component 332 along a lateral side of the door opening. In addition, an end portion 560 of pressure sensitive component 332 extends into a raised receiving portion 570 of connecting member 322.

Figure 6A:
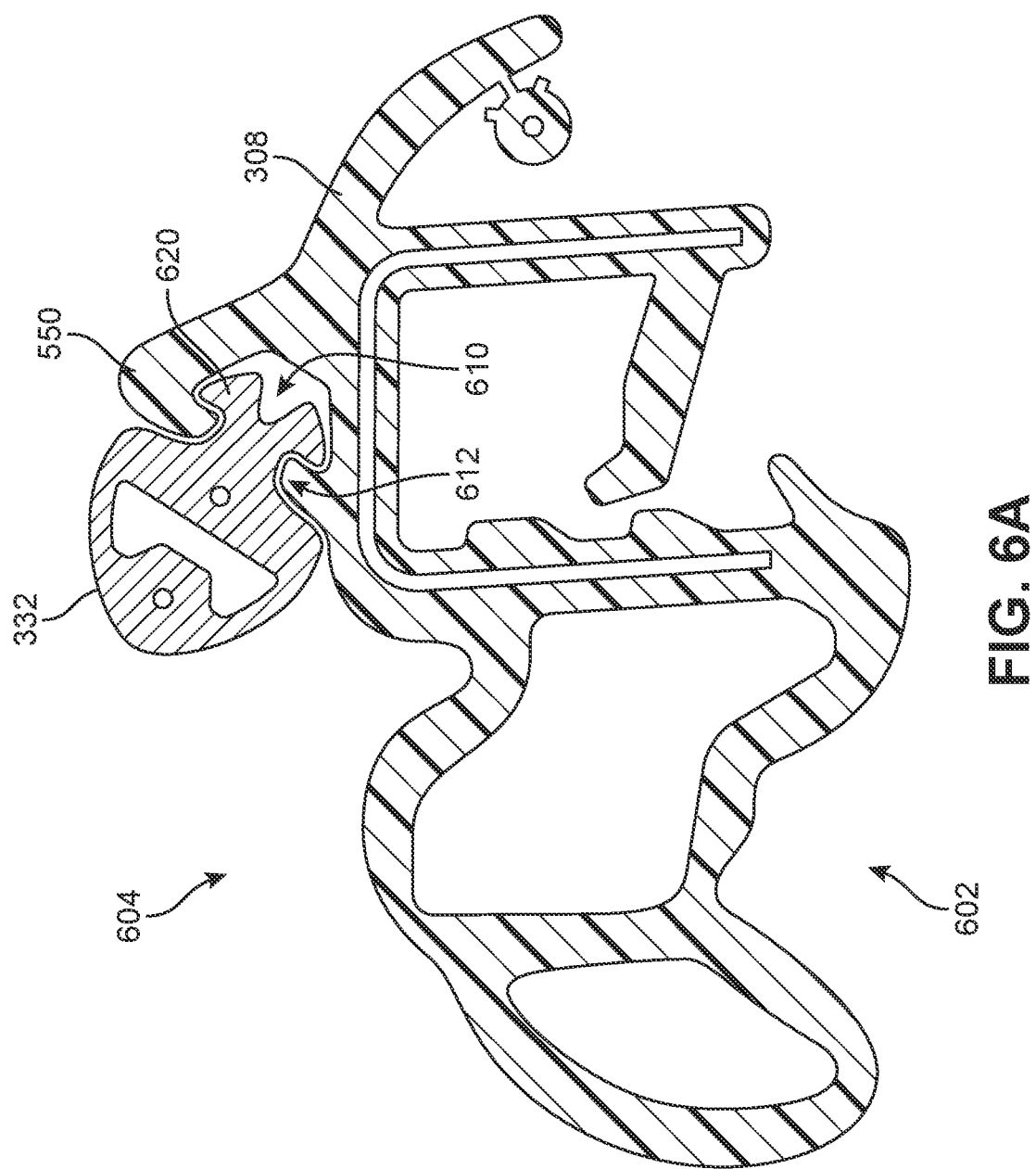
FIG. 6A is a schematic cross-sectional view of a portion of a door seal and a sensor assembly, according to an embodiment.

FIG. 6A is a schematic cross-sectional view of a portion of assembly 300. In this example, one possible geometry for lateral sealing member 308 is shown. An interior facing side 602 of lateral sealing member 308 may be attached to portions of a vehicle body. Outward facing side 604 of lateral sealing member 308 may face outwardly on the vehicle, and may be exposed when the door is not fully closed.

Retaining portion 550 of lateral sealing member 308 may comprise a channel 610 with a narrow slot 612 that provides access to channel 610. A protruding portion 620 of pressure sensitive component 330 may be inserted within channel 610. Protruding portion 620 has a width that is sufficient to be held firmly within channel 610. That is, as seen in FIG. 6A, protruding portion 620 has a substantially greater width than the width of slot 612.

Figure 6B:
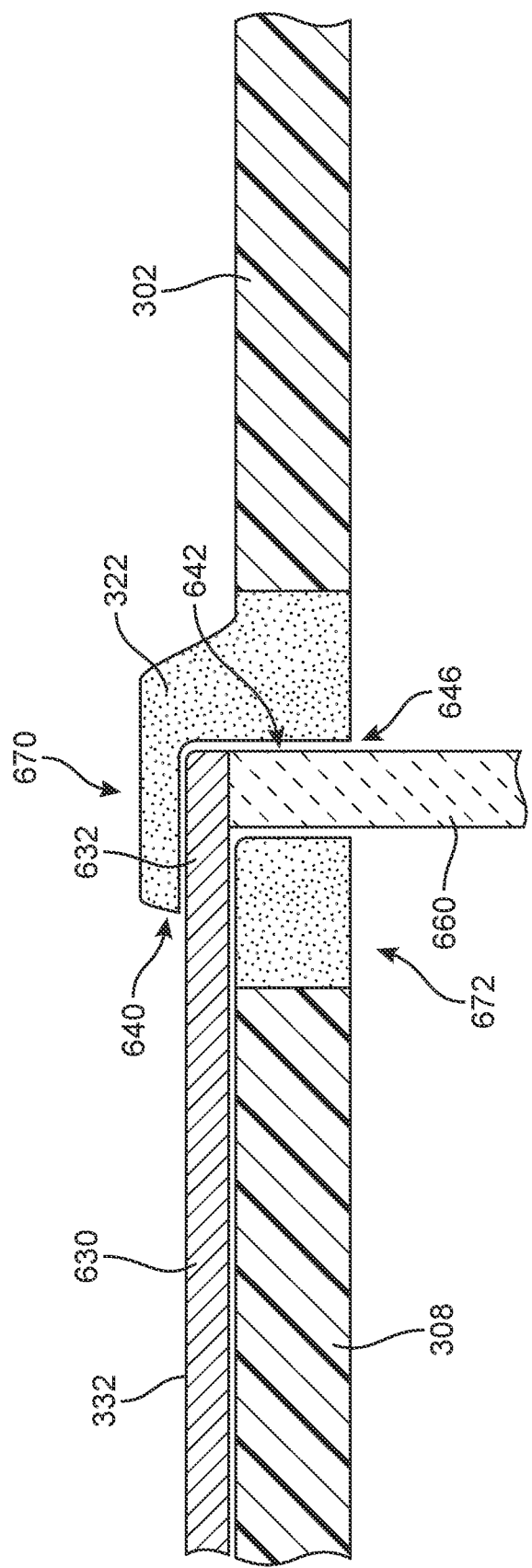
FIG. 6B is a schematic cross-sectional view of another portion of a door seal and sensor assembly, according to an embodiment.

FIG. 6B is a schematic cross-sectional view of a portion of assembly 300. As shown schematically in FIG. 6B, an intermediate portion 630 of pressure sensitive component 332 is disposed along lateral sealing member 308. Intermediate portion 630 is retained within channel 610 (see FIG. 6A). Additionally, an end portion 632 of pressure sensitive component 332 is disposed through a first opening 640 of a receiving cavity 642 of connecting member 322. Connecting member 322 also includes a second opening 646 that provides access to receiving cavity 642 on connecting member 330. An end of a wire harness 660 may be inserted through second opening 646, allowing pressure sensitive component 332 and wire harness 660 to be connected.

As seen in FIG. 6B, connecting member 322 has an outwardly facing side 670 and an inwardly facing side 672. In the exemplary embodiment, first opening 640 is disposed on outward facing side 670, while second opening 646 is disposed on inwardly facing side 672. This configuration allows pressure sensitive component 330 to be exposed along the exterior of the assembly. Moreover, this configuration allows wire harness 660 to extend directly from the vehicle body to connecting member 322.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. A motor vehicle, comprising:
   a vehicle body comprising a door opening, the door opening being disposed within an opening periphery of the vehicle body;
   the opening periphery comprising an upper body portion, a lower body portion, and a lateral body portion;
   a sliding door configured to cover at least a portion of the door opening when the sliding door is closed;
   a door seal and sensor assembly installed along the opening periphery, further comprising:
      a lateral sealing member attached to the lateral body portion and an upper sealing member attached to the upper body portion;
      the lateral sealing member including a retaining portion;
      a connecting member disposed between the lateral sealing member and the upper sealing member, wherein the connecting member includes an interior cavity, a first opening providing access to the interior cavity, and a second opening providing access to the interior cavity;
      a pressure sensitive component including a first end portion, a second end portion, and an intermediate portion;
      a wire harness configured to connect to the first end portion of the pressure sensitive component;
      wherein a protruding portion of the pressure sensitive component is retained within the retaining portion of the lateral sealing member;
      wherein the intermediate portion of the pressure sensitive component is exposed on an exterior of the door seal and sensor assembly;
      wherein the first end portion of the pressure sensitive component is disposed through the first opening and within the interior cavity of the connecting member;
      wherein a portion of the wire harness is inserted through the second opening of the connecting member; and
      wherein the first end portion of the pressure sensitive component connects to the portion of the wire harness within the interior cavity of the connecting member.

2. The motor vehicle according to claim 1, wherein the connecting member is more rigid than the lateral sealing member.

3. The motor vehicle according to claim 1, wherein the connecting member is more rigid than the lateral sealing member and than the upper sealing member.

4. The motor vehicle according to claim 1, wherein the connecting member is bonded to the lateral sealing member and to the upper sealing member.

5. The motor vehicle according to claim 1, wherein the lateral sealing member includes an inward facing side that confronts the lateral body portion of the vehicle body, and an opposing outward facing side, and wherein the retaining portion of the lateral sealing member is disposed on the outward facing side.

6. The motor vehicle according to claim 1, wherein the lateral sealing member and the upper sealing member are made of a material including rubber, and wherein the connecting member is made of a material including plastic.

7. A door seal and sensor assembly for installation within a motor vehicle, the motor vehicle having a lateral body portion and an upper body portion disposed around a door opening of the motor vehicle, the assembly comprising:
   a lateral sealing member configured to be attached to the lateral body portion of the motor vehicle and an upper sealing member configured to be attached to the upper body portion of the motor vehicle;
   the lateral sealing member including a retaining portion;
   a connecting member disposed between the lateral sealing member and the upper sealing member, wherein the connecting member includes an interior cavity, a first opening providing access to the interior cavity and a second opening providing access to the interior cavity;
   a pressure sensitive component including a first end portion, a second end portion, and an intermediate portion;
   wherein a protruding portion of the pressure sensitive component is retained within the retaining portion of the lateral sealing member;
   wherein the intermediate portion of the pressure sensitive component is exposed on an exterior of the door seal and sensor assembly;
   wherein the first end portion of the pressure sensitive component is disposed through the first opening and within the interior cavity of the connecting member; and
   wherein the second opening is configured to receive a portion of a wire harness, so that the pressure sensitive component and the portion of the wire harness can be connected within the interior cavity.

8. The assembly according to claim 7, wherein the connecting member is more rigid than the lateral sealing member.

9. The assembly according to claim 7, wherein the connecting member is more rigid than the lateral sealing member and than the upper sealing member.

10. The assembly according to claim 7, wherein the connecting member is bonded to the lateral sealing member and to the upper sealing member.

11. The assembly according to claim 7, wherein the lateral sealing member includes an inward facing side that is configured to confront the lateral body portion of the vehicle body, and an opposing outward facing side, and wherein the retaining portion of the lateral sealing member is disposed on the outward facing side.

12. The assembly according to claim 7, wherein the lateral sealing member and the upper sealing member are made of a material including rubber, and wherein the connecting member is made of a material including plastic.

13. The assembly according to claim 7, wherein the assembly further includes a lower connecting member attached to the lateral sealing member, and wherein the second end portion of the pressure sensitive component is attached to the lower connecting member.

14. A motor vehicle, comprising:
- a vehicle body comprising a door opening, the door opening being disposed within an opening periphery of the vehicle body;
- the opening periphery comprising an upper body portion, a lower body portion, a first lateral body portion, and a second lateral body portion;
- a first sliding door configured to cover a first portion of the door opening when the first sliding door is closed and a second sliding door configured to cover a second portion of the door opening when the second sliding door is closed;
- a door seal and sensor assembly installed along the opening periphery, further comprising:
  - a first lateral sealing member attached to the first lateral body portion, a second lateral sealing member attached to the second lateral body portion, and an upper sealing member attached to the upper body portion;
  - the first lateral sealing member including a first retaining portion and the second lateral sealing member including a second retaining portion;
  - a first connecting member disposed between the first lateral sealing member and the upper sealing member, wherein the first connecting member includes a first interior cavity;
  - a second connecting member disposed between the first second lateral sealing member and the upper sealing member, wherein the second connecting member includes a second interior cavity;
  - a first pressure sensitive component and a second pressure sensitive component;
  - a first wire harness configured to connect to the first pressure sensitive component and a second wire harness configured to connect to the second pressure sensitive component;
  - wherein the first pressure sensitive component includes a first protruding portion that is retained within the first retaining portion, wherein an intermediate portion of the first pressure sensitive component is exposed on an exterior of the door seal and sensory assembly and wherein an end portion of the first pressure sensitive component connects to the first wire harness within the first interior cavity of the first connecting member; and
  - wherein the second pressure sensitive component includes a second protruding portion that is retained within the second retaining portion, wherein an intermediate portion of the second pressure sensitive component is exposed on the exterior of the door seal and sensory assembly and wherein an end portion of the second pressure sensitive component connects to the second wire harness within the second interior cavity of the second connecting member.

15. The motor vehicle according to claim 14, wherein the upper sealing member extends continuously from the first connecting member to the second connecting member.

16. The motor vehicle according to claim 15, wherein the upper sealing member is bonded at a first end to the first connecting member and at a second end to the second connecting member.

17. The motor vehicle according to claim 14, wherein the first connecting member is more rigid than the first lateral sealing member and wherein the second connecting member is more rigid than the second lateral sealing member.

18. The motor vehicle according to claim 14, wherein the first lateral sealing member, the second lateral sealing member and the upper sealing member are comprised of the same material.

19. The motor vehicle according to claim 14, wherein the first pressure sensitive component is configured to detect pinching between the first sliding door and the first lateral body portion.

20. The motor vehicle according to claim 19, wherein the second pressure sensitive component is configured to detect pinching between the second sliding door and the second lateral body portion.

* * * * *